US008144248B2

(12) United States Patent
Sato

(10) Patent No.: US 8,144,248 B2
(45) Date of Patent: Mar. 27, 2012

(54) SCAN CONVERSION APPARATUS

(75) Inventor: Teruyuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1217 days.

(21) Appl. No.: 11/854,264

(22) Filed: Sep. 12, 2007

(65) Prior Publication Data

US 2008/0062310 A1    Mar. 13, 2008

(30) Foreign Application Priority Data

Sep. 13, 2006 (JP) ................................ 2006-247450
Mar. 13, 2007 (JP) ................................ 2007-064131

(51) Int. Cl.
H04N 7/01 (2006.01)
(52) U.S. Cl. .......................... 348/452; 348/448; 348/458
(58) Field of Classification Search .................. None
See application file for complete search history.

(56) References Cited

U.S. PATENT DOCUMENTS 5,661,525 A * 8/1997 Kovacevic et al. ............ 348/452
6,577,345 B1 * 6/2003 Lim et al. ...................... 348/452

FOREIGN PATENT DOCUMENTS

| CN | 1607827 A | 4/2005 |
|----|-----------|--------|
| EP | 1 484 919 A2 | 12/2004 |
| JP | 4-334186 | 11/1992 |
| JP | 2003-32636 | 1/2003 |
| JP | 2004-180242 | 6/2004 |
| JP | 2004-266395 | 9/2004 |
| JP | 2004-297476 | 10/2004 |
| JP | 2005-102191 | 4/2005 |
| JP | 2005-191619 | 7/2005 |
| JP | 2006-67009 | 3/2006 |
| JP | 2006-174123 | 6/2006 |

OTHER PUBLICATIONS

Chinese Office Action issued Sep. 18, 2009 in corresponding Chinese Patent Application 200710154431.3.
Japanese Office Action mailed Dec. 27, 2011 issued in corresponding Japanese Patent Application No. 2007-064131.

* cited by examiner

Primary Examiner — James R Sheleheda
Assistant Examiner — Rong Le
(74) Attorney, Agent, or Firm — Staas & Halsey LLP

(57) ABSTRACT

In a scan conversion apparatus, a first interpolation pixel generation unit generates an interpolation pixel of a nonexistent line for one of images of two fields based on a motion vector detected between the images of the same parity. A second interpolation pixel generation unit generates an intrafield interpolation pixel of a nonexistent line by using a pixel for the image of the field for which the interpolation pixel has been generated by the first interpolation pixel generation unit, among the images of the two fields. An erroneous-interpolation detection unit detects an erroneous interpolation for the interpolation pixel generated by the first interpolation pixel generation unit by comparing with pixels existing in the upper and lower lines. A signal blending output unit outputs a video signal using interpolation pixels generated by the first and second interpolation pixel generation units based on the detection by the erroneous-interpolation detection unit.

11 Claims, 17 Drawing Sheets

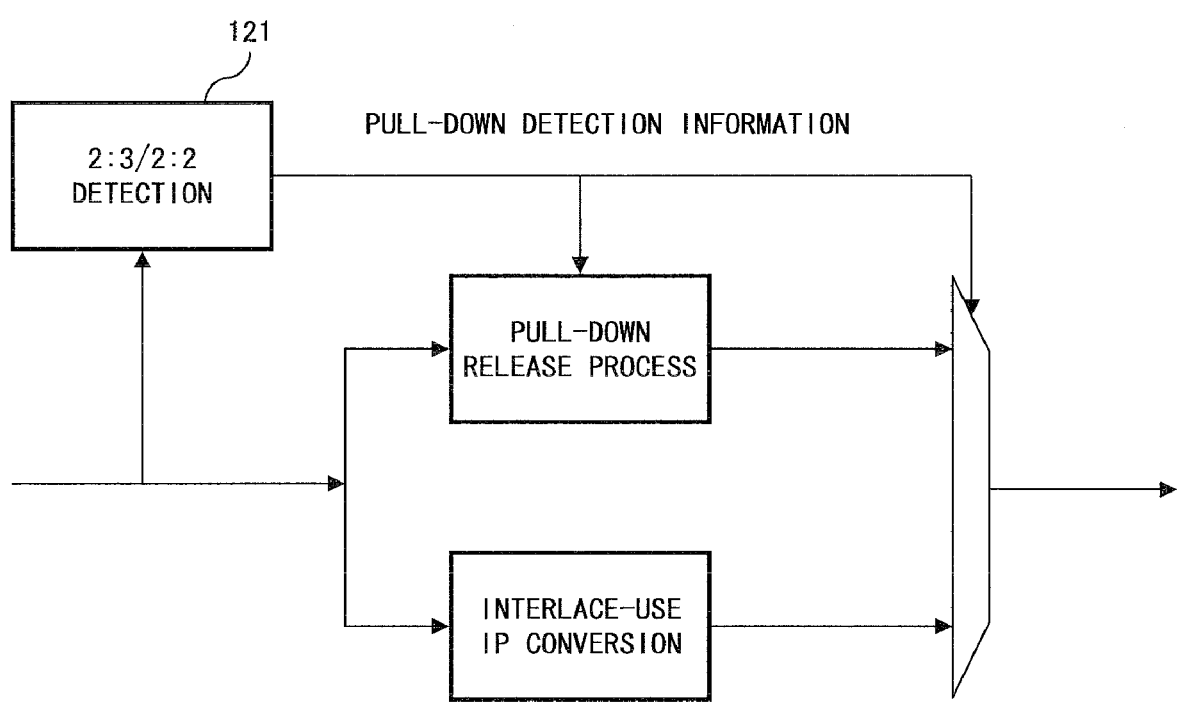
F I G. 4

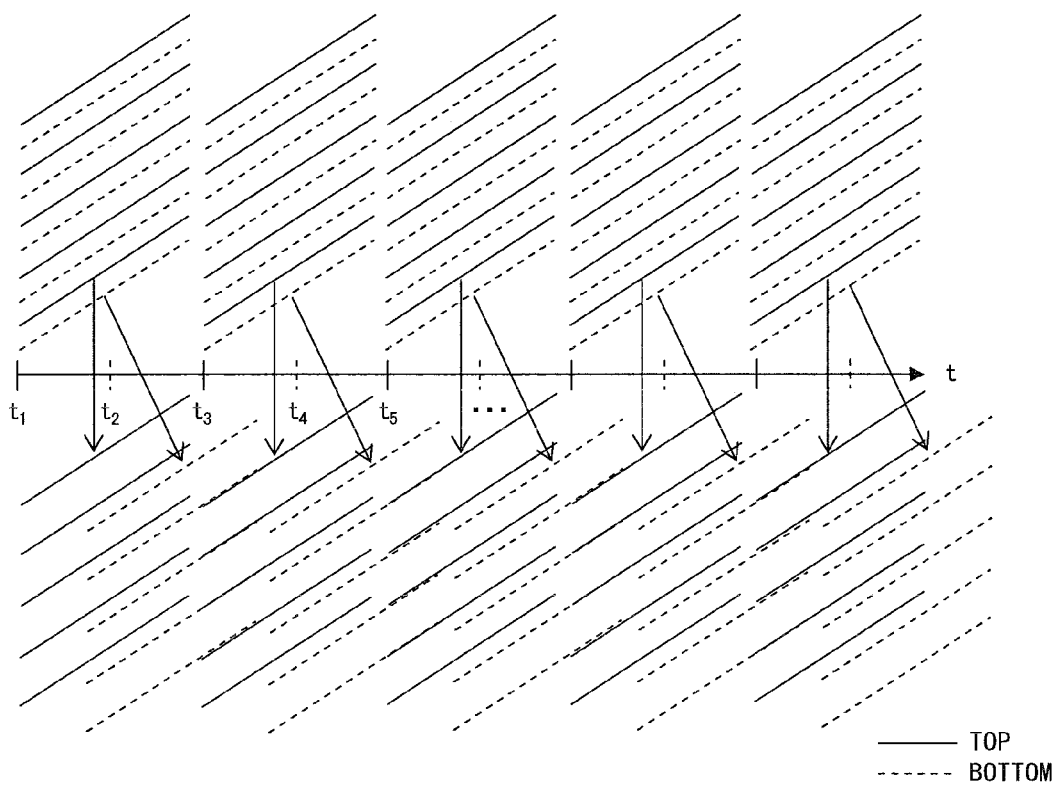
F I G. 5 A
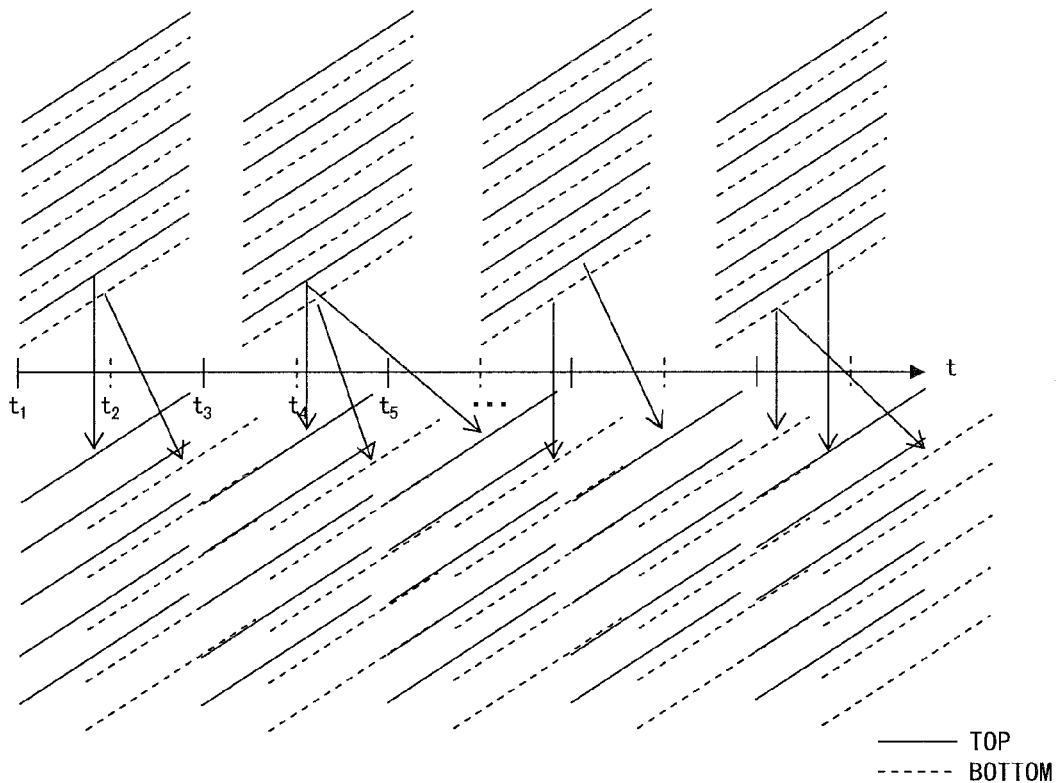
F I G. 5 B

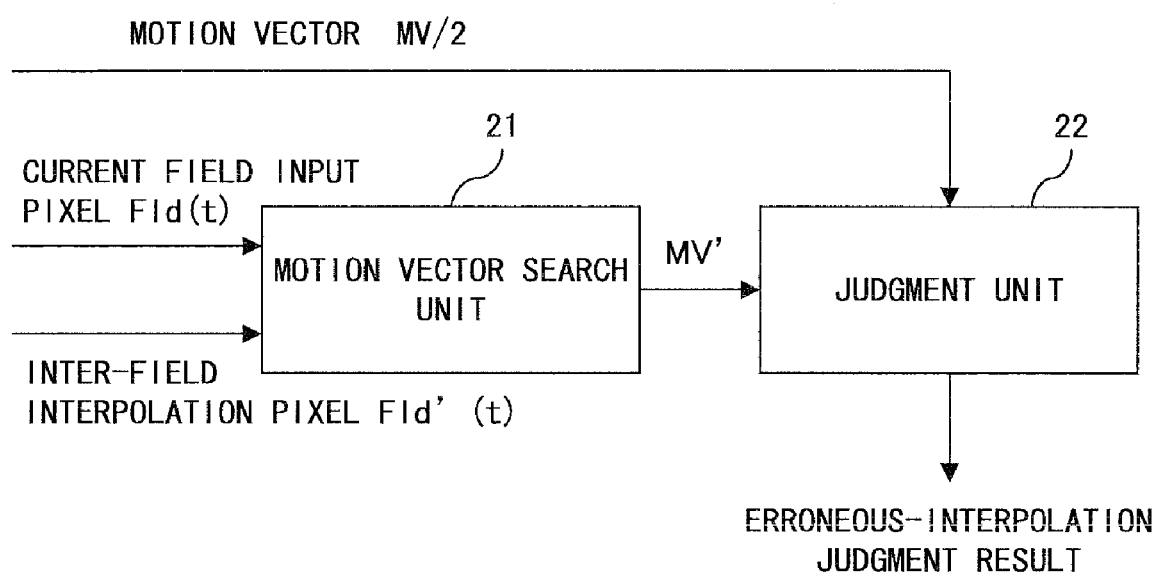
F I G. 7

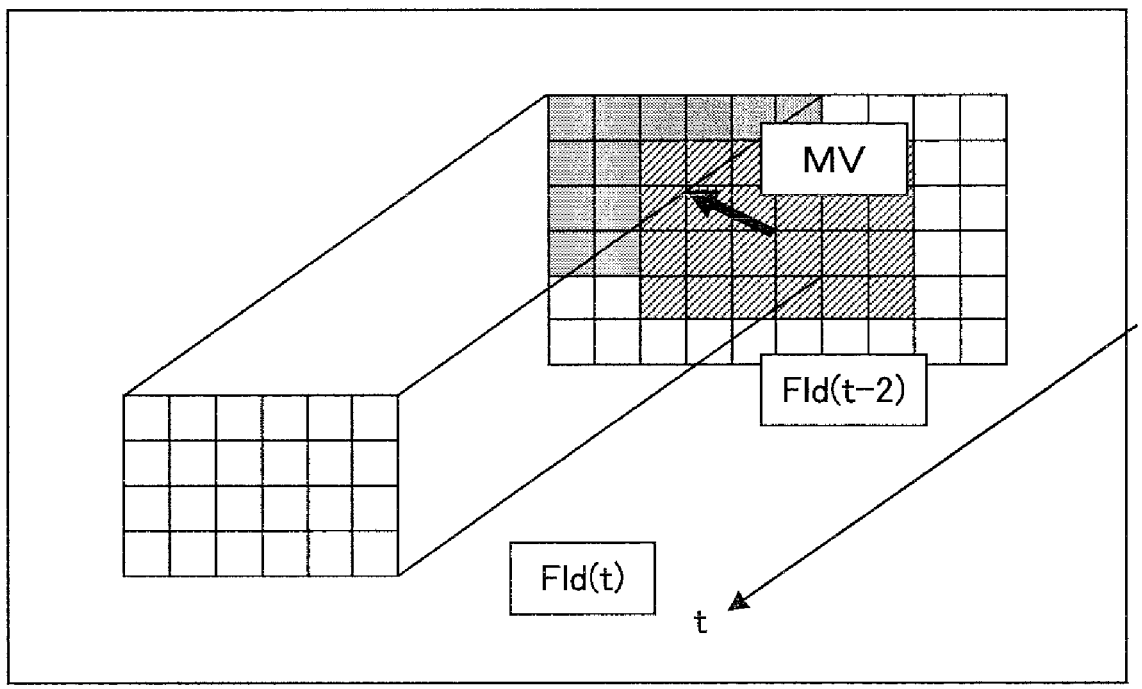
F I G. 8A
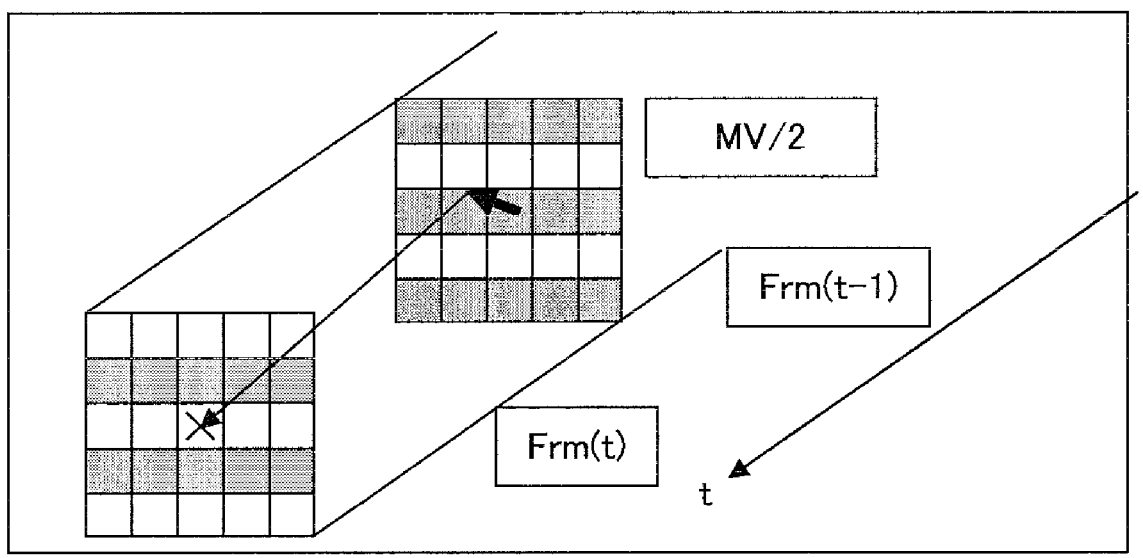
F I G. 8B

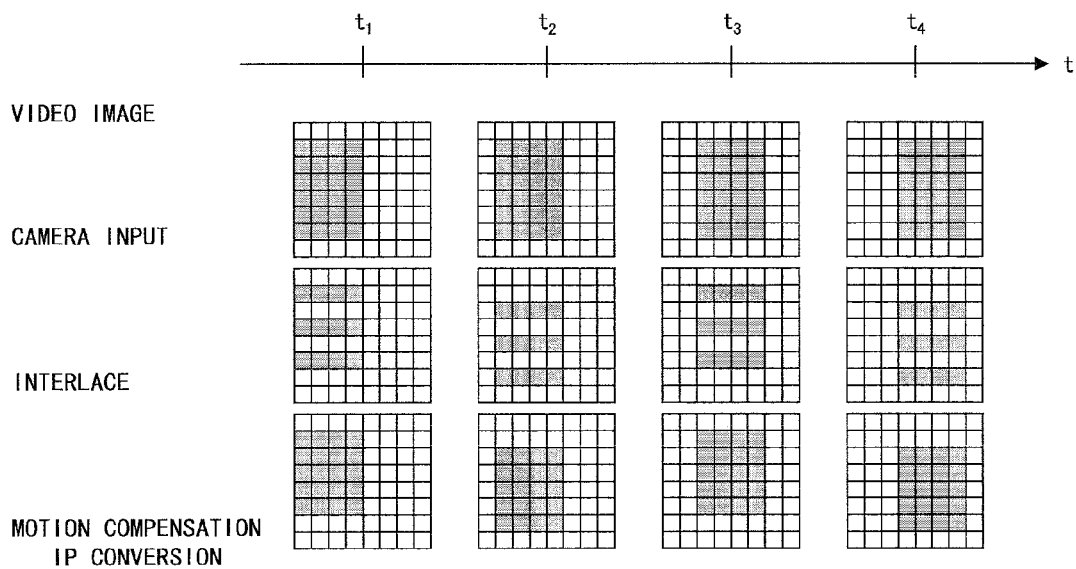
F I G. 10A
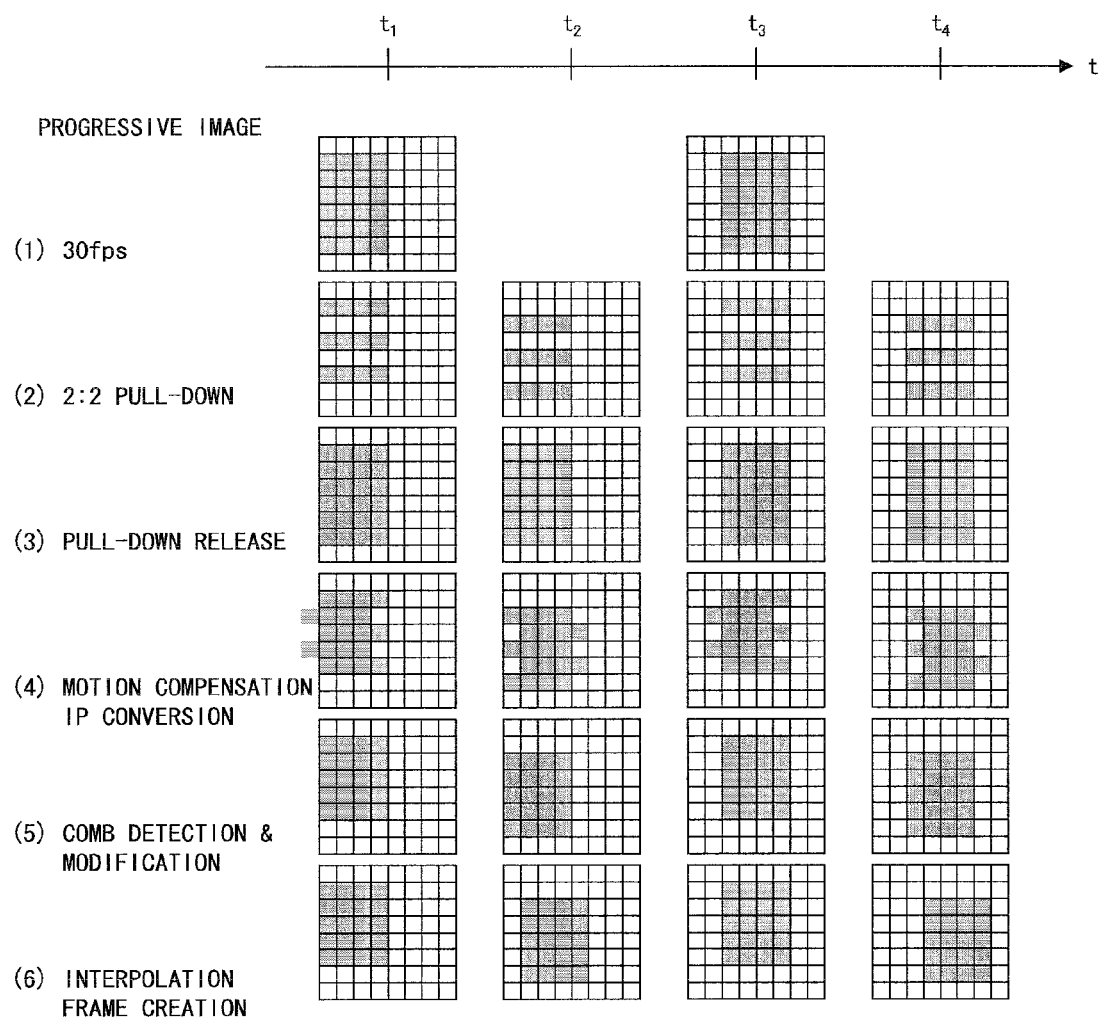
F I G. 10B

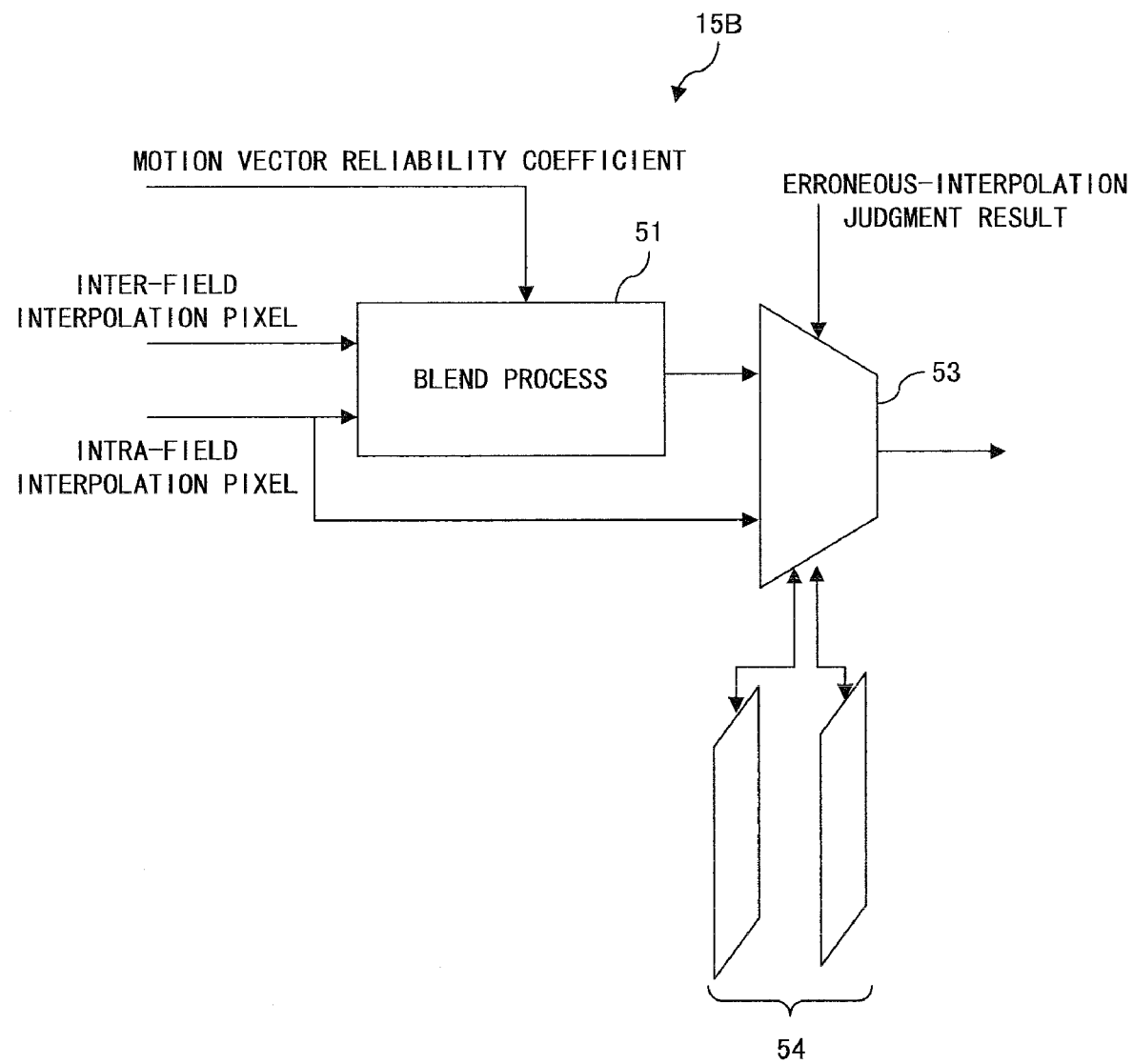
F I G. 1 2

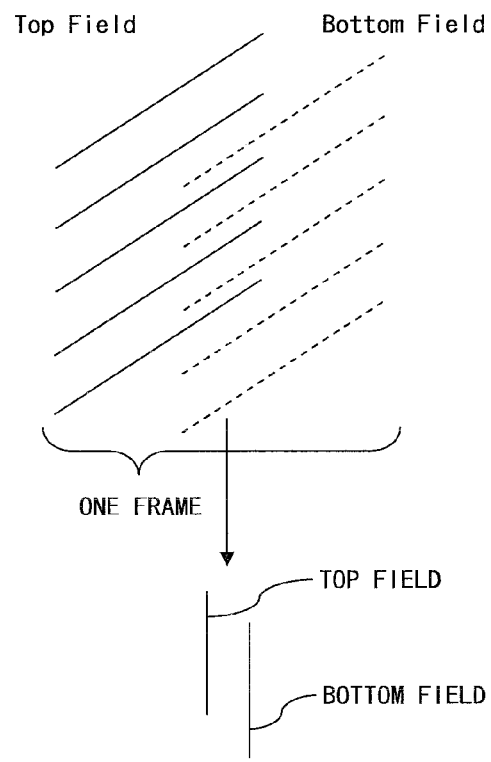
F I G. 1 3 A
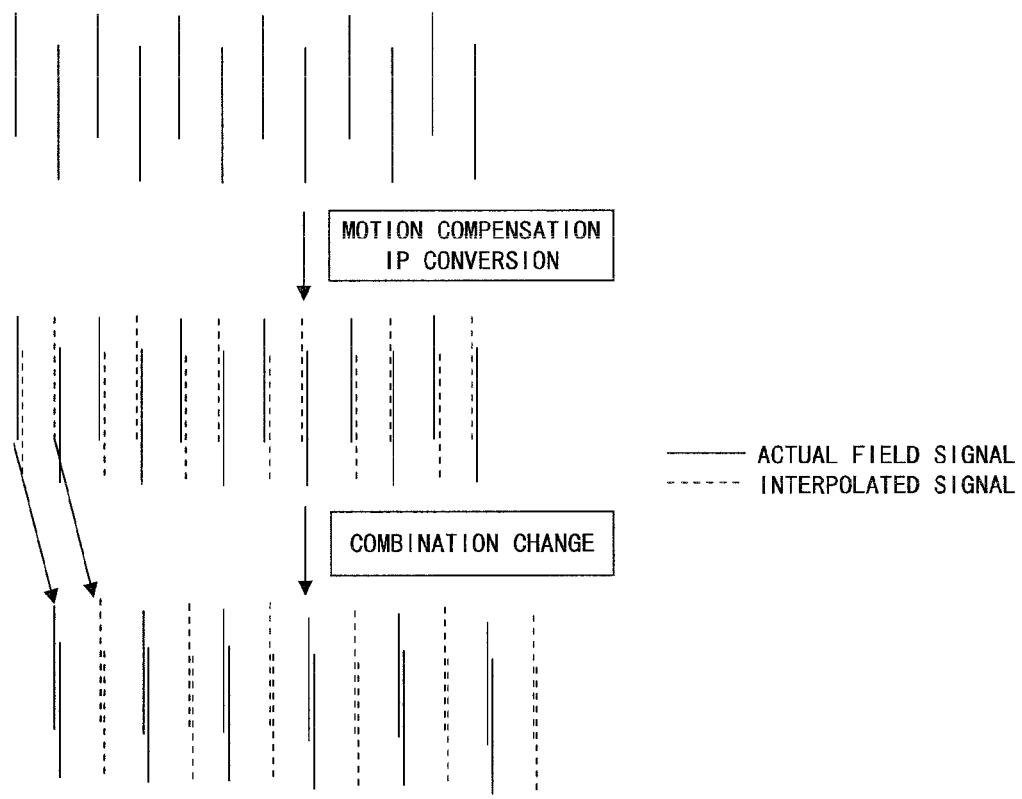
F I G. 1 3 B

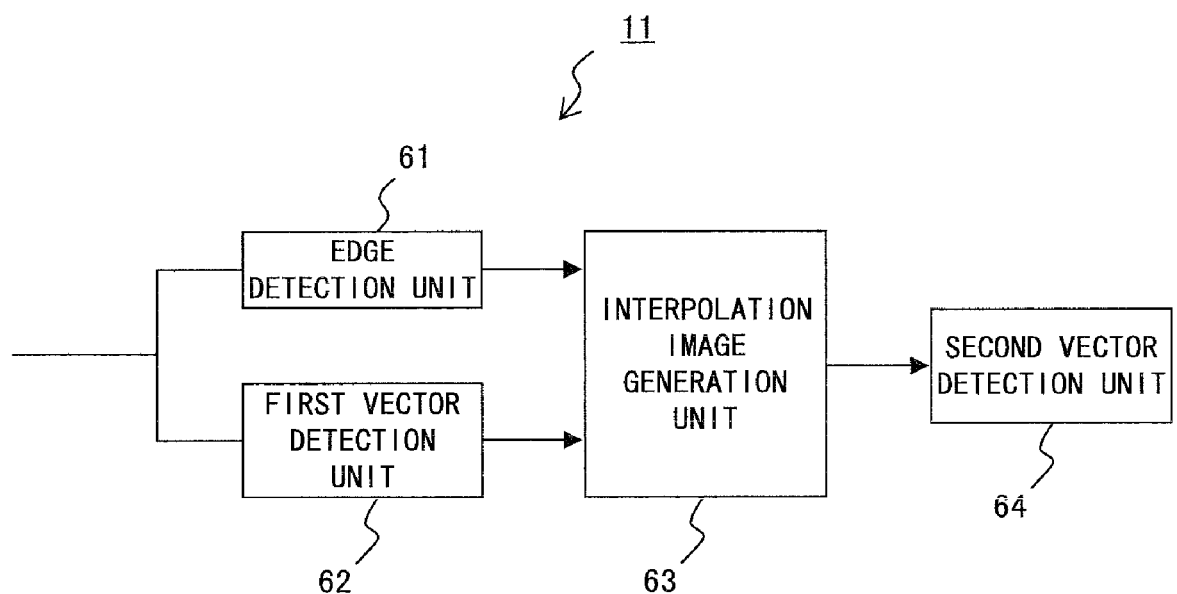
F I G. 14

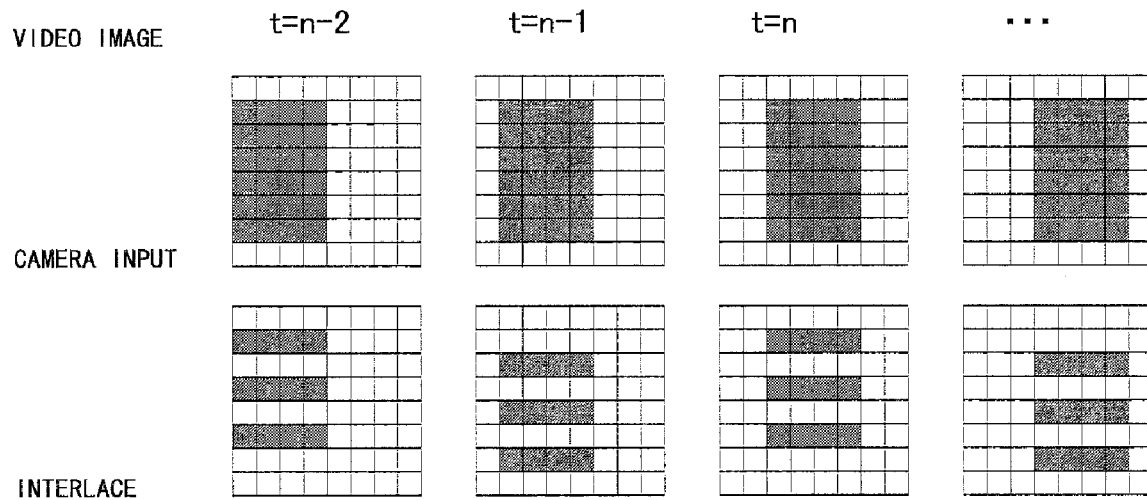
F I G. 1 5 A
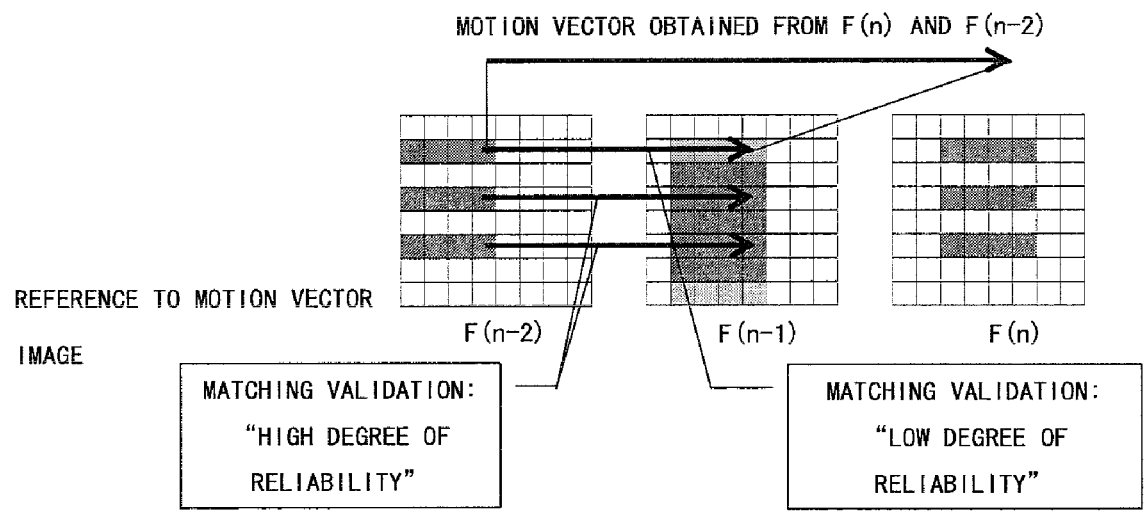
F I G. 1 5 B

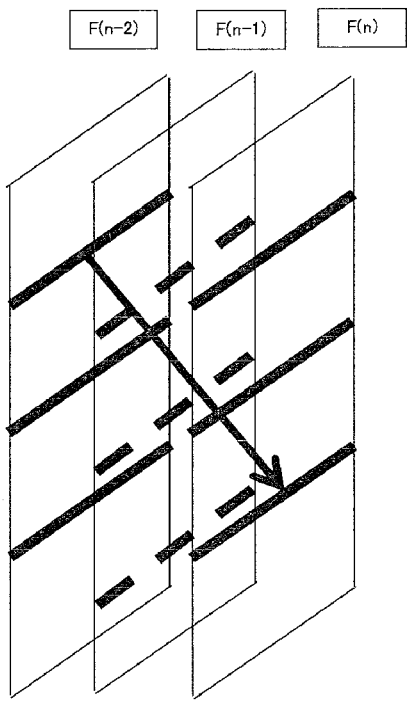
F I G. 16A
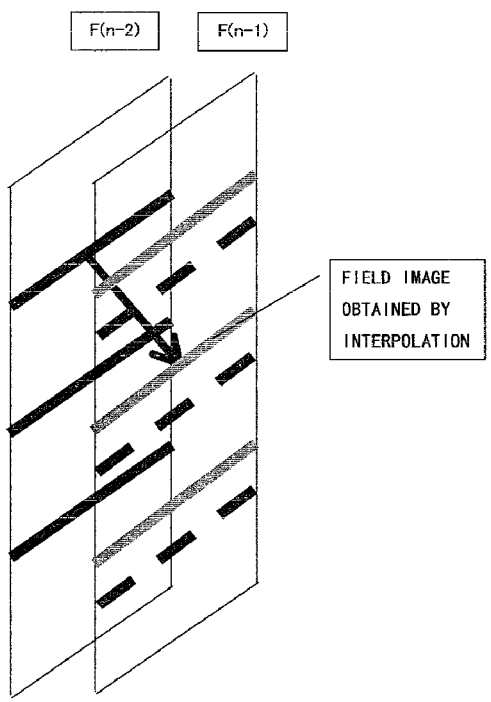
F I G. 16B

SCAN CONVERSION APPARATUS

BACKGROUND OF THE INVENTION

1. Field of the Invention

The present invention relates to a scan conversion apparatus for converting an interlace video signal to a progressive video signal.

2. Description of the Related Art

In order to output a signal transmitted by an interlace signal such as NTSC (National Television Standard Committee) and PAL (Phase Alternation by Line) on a plasma display and a liquid crystal display which have been rapidly popularized in recent years, it is necessary to perform an interlace/progressive conversion (abbreviated as "IP conversion" hereinafter). Conventionally methods for interpolating for a pixel between lines of an interlace video signal are used for the IP conversion.

An intra-field interpolation is given as an example of a method for interpolating a pixel. FIG. 1 is a diagram for describing an outline of the intra-field interpolation according to the conventional technique. In the showing of FIG. 1, only the pixels of specific spots are clearly shown to explain interpolation process, while other zones are omitted. Among the zone clearly showing pixels, the color-distinguished lines are pixels obtained by IP-converting an interlace video signal. The white-out line in the drawing indicates an interpolated line. As an example, a pixel indicated by the x-mark in FIG. 1 shows an example of interpolation in a bi-linear interpolation by using a pixel indicated by the o-mark.

An intra-field interpolation does not change a resolution in the vertical direction from the case of no interpolation, while a line based on the actual video signal and the interpolated line are guaranteed as the video signal of the same clock time. Such an interpolation method is effective when there is a movement in the video, and there are techniques capable of performing the above described intra-field interpolation in the case of a movement existing as a result of a judgment of a presence/absence of a movement in the video, as shown in Laid-Open Japanese Patent Application Publication Nos. 2003-32636, 2004-266395, 2005-191619 and 2006-67009.

FIG. 2 is a diagram for describing a motion-adaptive IP conversion according to a conventional technique. The movement judgment unit 101 shown in FIG. 2 judges a movement of a video image based on a comparison between the video signal of the previous field and that of the current field. It then generates the inter-field interpolation pixel for a still image and generates an intra-field interpolation pixel for a motion image based on the judgment result produced by the movement judgment unit on the movement of the video image.

FIG. 3 is a diagram for describing a motion compensation IP conversion according to a conventional technique. The motion compensation IP conversion compares between field signals of the same parity, thereby measuring a movement amount of the video image and generating an interpolated pixel based on the movement amount. The motion vector detection unit 111 shown in FIG. 3 searches a movement amount of the pixels of a predetermined target between two field signals (i.e., Fld(t) and Fld(t−2) herein) and estimates a movement amount in a single field to interpolate it. The blend process unit calculates a weighted sum of inter-field/intra-field interpolation pixels for every spot within a field signal and outputs a post-IP conversion signal.

Incidentally, transmitted video signals include a film material of a movie, animation, et cetera, and a computer graphic material and such. These signals are subjected to a telecine conversion, such as 2:2 pull-down, 2:3 pull-down or such at a transmission source of the signal and transmitted by superimposing on the interlace video signal. A reception side is required to perform a process for releasing these pull-down sequences.

FIG. 4 is a diagram showing a configuration of a scan conversion apparatus used for releasing a pull-down. When a 2:3 or 2:2 video image transmission sequence is detected from a received signal at the 2:3/2:2 sequence detection unit 121, the video signal is given to the pull-down release process unit at which a process for a progressive conversion is carried out. A video signal not subjected to a pull-down is subjected to a scan conversion at the interlace-use IP conversion unit. Note that the configuration and operation of the interlace-use IP conversion unit are similar to the process of the motion-adaptive IP conversion or motion compensation IP conversion.

Here, a further description of the pull-down sequence is provided. FIGS. 5A and 5B are diagrams for describing a pull-down sequence. FIG. 5A is a drawing expressing a 2:2 pull-down process, while FIG. 5B is a drawing expressing a 2:3 pull-down.

First is a description on the 2:2 pull-down shown in FIG. 5A. In relation to the time axis shown in the drawing, the upper part is a video signal prior to executing a pull-down and the lower part is a video signal after executing the pull-down. Also in the drawing, the solid line expresses a signal transmitted in the top field among the video signal, while the dotted line expresses a signal transmitted in the bottom field.

When changing a certain frame into an interlace video signal, the 2:2 pull-down process transmits a signal by loading the top field and bottom field alternately. Here, transmission timings of individual fields are assumed to be t1, t2 and so on. Assuming that a video signal of the top field of the first frame is loaded at the clock time t1, a video signal of the bottom field of the first frame is loaded at the clock time t2 that is the next transmission timing. Likewise, a video signal of the top field is loaded at the clock time t3, and that of the bottom field is loaded at the clock time t4, for the second frame. As such, the assigned number of fields is constituted by the ratio of 2:2 between the odd numbered frame and even numbered frame.

Comparably, in the 2:3 pull-down process shown in FIG. 5B, the assigned number of fields is constituted by the ratio of 2:3 between the odd numbered frame and even numbered frame. That is, video signals of the top field and bottom field are loaded/transmitted at the clock times t1 and t2, respectively, for the first frame, while video signals of the top field, bottom field and top field are loaded/transmitted at the subsequent clock times t3, t4 and t5 for the second frame.

In actuality, a hardly avoidable problem at the detection unit of the 2:2 and 2:3 sequences is an erroneous detection due to a noise and such. Although a high image quality can be highly effectively available for a 2:2 material and 2:3 material, an erroneous detection can lead to a large degradation in the image quality. Because of this, a final adjustment at a television set manufacturer is generally set up for detecting only a material which can be securely detected. As a result, there are some video image sequences which are not detected as the 2:2 or 2:3 video image sequences among the transmitted sequences.

Meanwhile, in the actual video image signals, there is a case in which the 2:2 or 2:3 pull-down video signal and interlace video signal are temporally and spatially mixed and transmitted. In such a case, it has been impossible to partially perform a conventional interlace-use IP conversion.

Furthermore, it is difficult to detect a difference of changes between fields for a slow motion video image because the difference of change between fields is small. Because of these reasons, an interlace-use IP conversion is performed on a video image signal in which a sequence is not detected.

Performing a motion-adaptive interpolation or a motion compensation interpolation in the interlace-use IP conversion on the 2:2 or 2:3 video image signal results in generating a problem of flicker, jaggy, interlace interference, et cetera. That is, despite there is actually no need to interpolate video signals of two fields which are pulled down to the top and bottom for a telecine video signal, an interpolation process is carried out if a motion is detected between the current and next frames, causing a disturbance in the image as a result of interpolating a pixel for a signal which does not actually exist within a frame.

In the meantime, Laid-Open Japanese Patent Application Publication Nos. 2005-102191 and 2004-180242 have proposed various techniques carrying out a pull-down release process first for detecting a generated erroneous interpolation in order to improve an image quality of a video image including the 2:2 or 2:3.

The technique noted in the Laid-Open Japanese Patent Application Publication No. 2005-102191 first releases a pull-down, then, if an erroneous interpolation is detected at the pull-down error detection unit, corrects the spot in which the erroneous interpolation has been detected by carrying out an interlace-use IP conversion. The employment of such a method makes it difficult to set a condition for checking an erroneous interpolation on one hand and precludes an effective use of information, which has been used for the conventional 2:2/2:3 detection process, in the process for detecting the erroneous interpolation on the other. Therefore, the production of such an image processing apparatus is relatively high cost. Furthermore, the process carried out at the pull-down error detection unit for detecting an erroneous interpolation can hardly be effective erroneous interpolation detection means because an erroneous interpolation is not necessarily judged numerically.

The technique noted in the Laid-Open Japanese Patent Application Publication No. 2004-180242 judges a telecine video image by detecting a repetition of the same image, thereby making it possible to respond to an erroneous interpolation due to a pull-down process. While the technique is effective to a video image in which a telecine video image (i.e., a video image generated by a telecine conversion) and an interlace video image are temporally intermixed; the technique, however, cannot respond to a video image in which they are spatially intermixed. Meanwhile, the technique noted in the Laid-Open Japanese Patent Application Publication No. 2004-180242 is one for responding to the problem of a video image signal being subjected to a pull-down process if the video image signal cannot be judged as a non-telecine image.

It is desirable to be capable of detecting the fact of an interlace IP conversion being performed for a video image signal including 2:2 and 2:3 and responding to an erroneous interpolation generated in association with performing the interlace-use IP conversion.

SUMMARY OF THE INVENTION

The purpose of the present invention is to provide a technique for highly precisely detecting an erroneous interpolation associated with performing an IP conversion on a telecine video image which is difficult to be detected.

In order to solve the above described problem, the present invention is a scan conversion apparatus for converting an interlace video image signal into a progressive image signal comprising: a first interpolation pixel generation unit for generating an interpolation pixel of a nonexistent line for one of images of two fields of same parity based on a motion vector detected between images of the two fields; a second interpolation pixel generation unit for generating an interpolation pixel of a nonexistent line by using a pixel within a field for an image of the field for which an interpolation pixel is generated by the first interpolation pixel generation unit among the images in the two fields; an erroneous-interpolation detection unit for detecting an erroneous interpolation among interpolation pixels generated by the first interpolation pixel generation unit based on a comparison with a pixel existing in the upper and lower lines; an output unit for outputting a video image signal by using an interpolation pixel generated by the first and second interpolation pixel generation units based on the detection result of the erroneous-interpolation detection unit.

When generating an inter-field interpolation pixel, a motion compensation IP conversion is carried out by using a motion vector obtained from the fields of the same parity. In the case of performing a motion compensation IP conversion for an image including a telecine video image, a fact of shift occurring between the actual pixel and interpolation pixel in the direction of line is detected by the erroneous-interpolation detection unit. This configuration makes it possible to prevent an artifact appearing in a video image including a telecine video image.

The motion vector detection unit may use field data of different parity as a reference for validating a vector after obtaining it only from between images of two fields of the same parity. And the interpolation unit may be controlled in accordance with a presence or absence of a horizontal edge.

The erroneous-interpolation detection unit may be configured to comprise a shift detection unit for detecting a fact of a shift in the direction of line, occurring between a line determined to be a subject of interpolation performed by the first interpolation pixel generation unit and a line located either above or below the aforementioned line by one line, and a comparison-judgment unit for judging whether or not an erroneous interpolation based on a comparison between a shift and the motion vector related to the direction of line if the shift is detected by the shift detection unit. The comparison-judgment unit may be configured to judge that the interpolation performed by the first interpolation pixel generation unit is an erroneous interpolation if the shift is equal to a half of the motion vector in the direction of line.

The output unit may be configured to output a video signal by using the interpolation pixel generated by the second interpolation pixel generation unit if the comparison-judgment unit judges to be an erroneous interpolation. An artifact of an image is prevented by not outputting a pixel of an erroneous interpolation due to a motion compensation IP conversion.

An alternative configuration may further comprise a recording unit for recording a pixel signal of an input field and a pixel signal of the field generated by the first interpolation pixel generation unit, wherein the output unit combines a pixel signal of the previous field recorded in the recording unit with the pixel signal of the field judged to be an erroneous interpolation and outputs the resultant if the comparison-judgment unit judges to be an erroneous interpolation. It is also possible to prevent an artifact of an image by effectively utilizing an interpolation pixel, instead of discarding it, generated by the first interpolation pixel generation unit even if the interpolation is judged to be an erroneous interpolation.

The present invention is contrived to detect an erroneous interpolation highly accurately, even if the erroneous interpolation is caused by subjecting a video image signal, which is intermixed with a telecine material temporally and spatially and which is difficult to detect, to a motion compensation. IP conversion, thereby enabling a prevention of an erroneous interpolation. This enables a conversion into a progressive image signal without producing an artifact.

BRIEF DESCRIPTION OF THE DRAWINGS

FIG. 4 is a diagram for describing a pull-down sequence release according to a conventional technique;

FIG. 5A is a diagram for describing a pull-down sequence;

FIG. 5B is a diagram for describing a pull-down sequence;

FIG. 7 exemplifies a configuration of an erroneous-interpolation detection unit;

FIG. 8A is a diagram describing a motion vector and an interpolation between fields;

FIG. 8B is a diagram describing a motion vector and an interpolation between fields;

FIG. 10A is a diagram for describing an operation of a scan conversion apparatus;

FIG. 10B is a diagram for describing an operation of a scan conversion apparatus;

FIG. 12 exemplifies another configuration of a signal blending output unit;

FIG. 13A is a diagram for describing a control of a combination of fields;

FIG. 13B is a diagram for describing a control of a combination of fields;

FIG. 14 shows another method for obtaining a motion vector;

FIG. 15A is a diagram describing an operation of a motion vector detection unit 11 shown in FIG. 9;

FIG. 15B is a diagram describing an operation of a motion vector detection unit 11 shown in FIG. 9;

FIG. 16A is a diagram for describing a process for comparing a vector of half length of a motion vector with an interpolation image;

FIG. 16B is a diagram for describing a process for comparing a vector of half length of a motion vector with an interpolation image.

DESCRIPTION OF THE PREFERRED EMBODIMENTS

The following is a detailed description of the preferred embodiment of the present invention by referring to the accompanying drawings.

Figure 1:
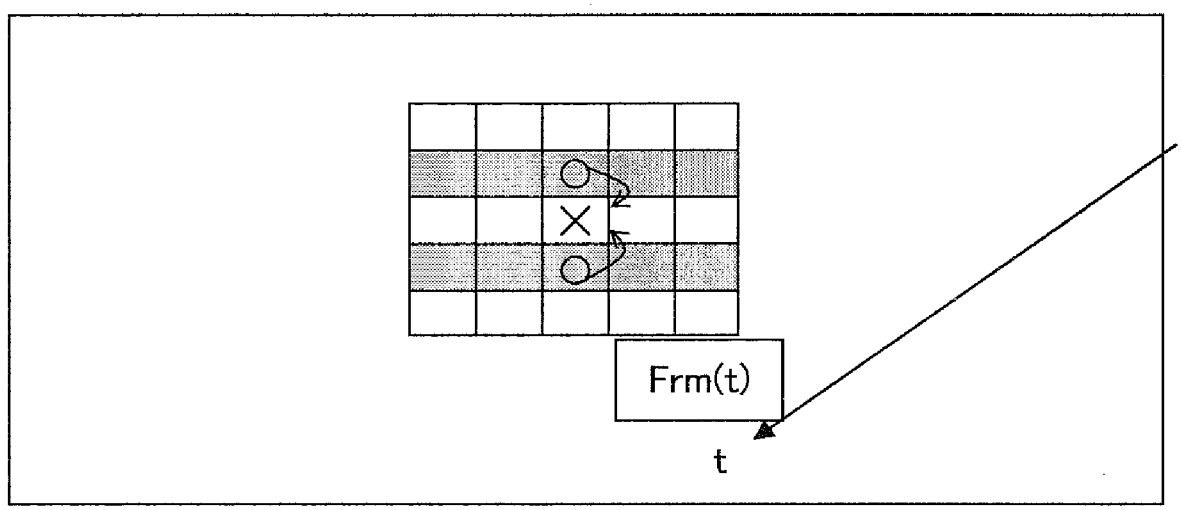
FIG. 1 is a diagram for describing an outline of an intra-field interpolation according to a conventional technique.
Figure 2:
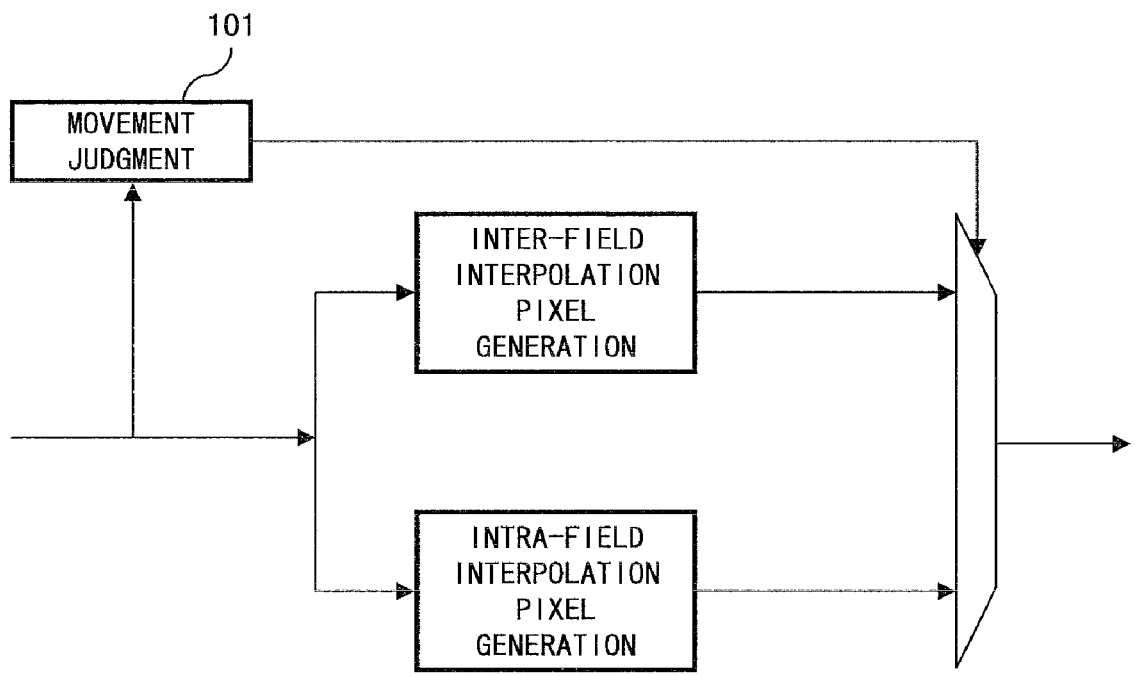
FIG. 2 is a diagram for describing a motion-adaptive IP conversion according to a conventional technique.
Figure 3:
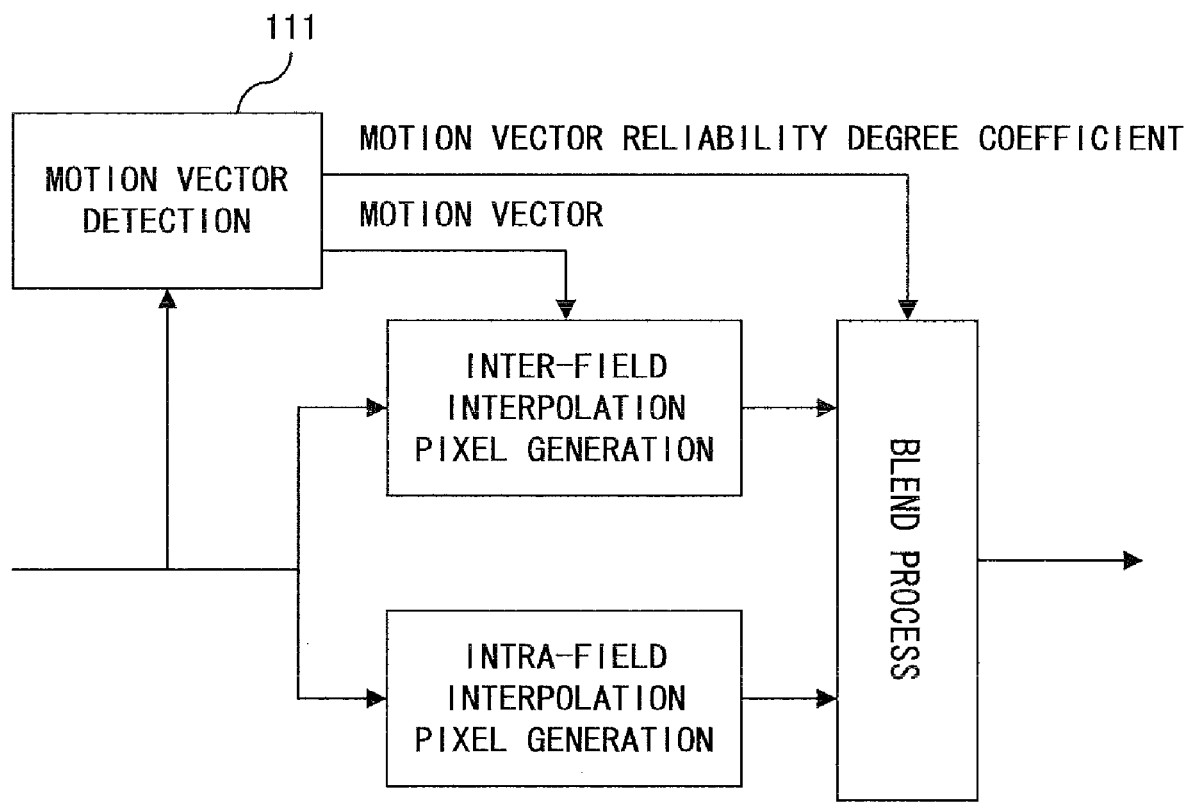
FIG. 3 is a diagram for describing a motion compensation IP conversion according to a conventional technique.
Figure 6:
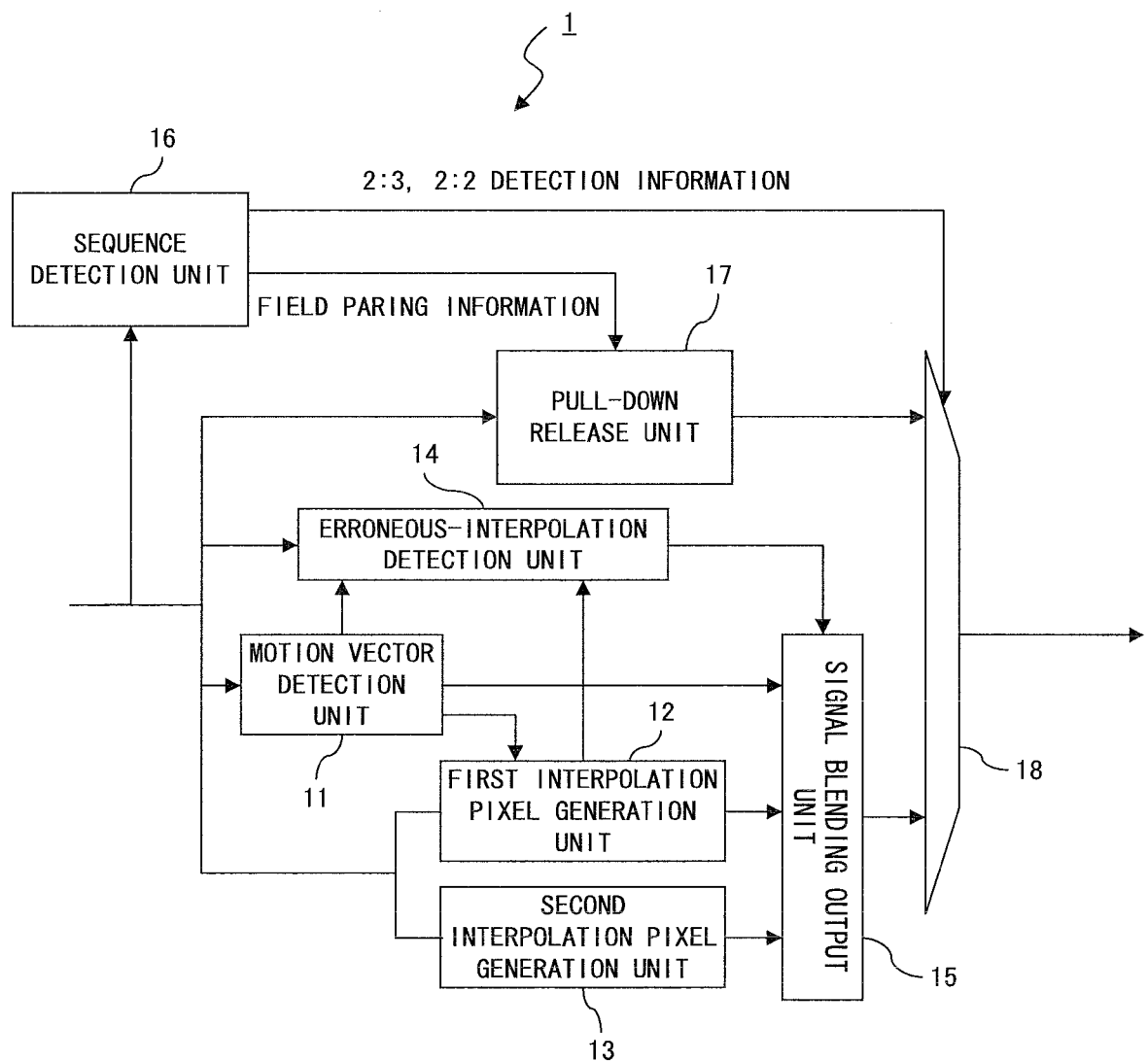
FIG. 6 is a diagram of the principle of a scan conversion apparatus according to the present embodiment.

FIG. 6 is a diagram of the principle of a scan conversion apparatus according to the present embodiment. The scan conversion apparatus 1 shown in FIG. 6 comprises a motion vector detection unit 11, a first interpolation pixel generation unit 12, a second interpolation pixel generation unit 13, an erroneous-interpolation detection unit 14, a signal blending output unit 15, a sequence detection unit 16, a pull-down release unit 17 and a selector unit 18.

The motion vector detection unit 11 compares two fields of the same parity and detects a motion vector of the video image. The first interpolation pixel generation unit 12 generates a pixel interpolated between fields if a motion is detected by the motion vector detection unit 11. The second interpolation pixel generation unit 13 generates a pixel interpolated within the field if a motion is not detected by the motion vector detection unit 11. The erroneous-interpolation detection unit 14 detects an erroneous interpolation related to an IP conversion based on the detected vector and an image interpolated between the fields. The signal blending output unit 15 generates an output signal based on the interpolation pixel, motion vector and the process result of the erroneous-interpolation detection unit 14.

The sequence detection unit 16 detects a sequence such as 2:2 and 2:3 from the received video image signal. The pull-down release unit 17 carries out a process for releasing a pull-down for the sequence detected by the sequence detection unit 16 and converts the video image signal into a progressive image signal. The selector unit is configured to include a selector and output a signal from the scan conversion apparatus 1 based on the outputs of the signal blending output unit 15 and pull-down release unit 17.

The scan conversion apparatus 1 according to the present embodiment comprises an erroneous-interpolation detection unit 14, which detects an erroneous interpolation performed on a telecine video image which does not actually require an inter-field interpolation, based on a motion vector and an interpolation pixel between fields. The signal blending output unit 15 outputs an interpolation pixel as a result of giving weighting to a pixel interpolated between the fields and that to a pixel interpolated within the field based on the judgment result of the erroneous-interpolation detection unit 14 related to an erroneous interpolation. The selector unit 18 selects a signal to be output on the basis of the result of pulling down the sequence and the interpolation result related to the video image signal of the field.

The following is a specific description on an operation of an individual unit constituting the scan conversion apparatus 1.

FIG. 7 exemplifies a configuration of the erroneous-interpolation detection unit 14. The erroneous-interpolation detection unit 14 comprises a motion vector search unit 21 and a comparison-judgment unit 22.

The motion vector search unit 21 searches a presence or absence of a shift in the horizontal direction based on a pixel in a field at the clock time t (which is defined as the current field input pixel Fld(t)) and an inter-field interpolation pixel Fld(t)' generated from the current field input pixel Fld(t) by the first interpolation pixel generation unit 12. The comparison-judgment unit 22 compares a motion vector MV detected by the motion vector detection unit 11 with a vector MV' indicating a shift in the horizontal direction obtained by the motion vector search unit 21, thereby judging whether or not the shift between the field pixels Fld(t) and Fld(t)' in the line direction is due to an erroneous interpolation caused when converting a pull-down sequence video image erroneously into a progressive image.

Hereinafter, a motion vector MV detected by the motion vector detection unit 11 will be described below. FIGS. 8A and 8B are diagrams describing a motion vector and an interpolation between fields. FIG. 8A is a diagram for describing a method for detecting a motion vector related to a field pixel Fld(t) transmitted at the clock time t.

A field signal in the previous field by two fields compared to the field at the clock time t, that is, at the clock time "t−2" is the same parity of that of the field signal at the clock time t. That is, if a video signal of the top/bottom field is received at the clock time t, a video signal of the top/bottom field is also received at the clock time t−2. Based on the fact, a movement amount of an image at the clock time t is obtained by comparing with a proximate field signal of the same parity.

As an example, related to a zone (i.e., a pixel occupying the position indicated by the diagonal hatching in the drawing at the clock time t−2) of a 6×4 size, searched is where the zone is located at the clock time t, that is, after two fields. In the example shown in FIG. 8A, the range of a plus/minus two pixels in the horizontal direction and that of a plus/minus one pixel is searched. A motion vector MV is obtained from the spot of the highest correlation in the search range. In FIG. 8A, the motion vector MV is (−2, 1). The motion vector MV is a movement amount during the time of two clock times, and therefore the movement amount between the clock t−1 and clock t is assumed to be MV/2, thereby performing an inter-field interpolation.

FIG. 8B is a diagram for describing an inter-field interpolation by using a motion vector MV. In the delineation of FIG. 8B, the hatched part indicates a zone in which a field signal exists, and a whiteout part indicates a zone for which an interpolation pixel is to be generated.

In order to interpolate for a frame signal Frm(t) at the clock time t, a frame signal of one-clock time prior to the clock time t, that is a frame signal Frm(t−1) at the clock time t−1. An interpolation is carried out by moving a signal existing at the clock time t−1 in the amount of the vector MV/2 equivalent to the movement amount for one clock time. The example shown in FIG. 8B indicates, by an x mark, the interpolation pixel obtained by moving the field signal existing of the Frm(t−1) by a MV/2 among the frame signals Frm(t).

Incidentally, there is a case in which a vector of one half of a motion vector MV for performing an inter-field interpolation is not expressed by an integer coordinates. In such a case, an intra-field interpolation pixel is generated for a frame signal Frm(t−1) at one clock time prior to the clock t, and an interpolation of a frame signal of Frm(t) is interpolated based on the obtained interpolation pixel data. A method for performing an inter-field interpolation by using a motion vector, including the interpolation method for use in the case of a movement amount for one clock time being not expressed in an integer, employs a known technique.

As described above, an inter-field interpolation pixel is obtained as a movement of MV/2 existing between a field of one-clock time prior and the current field. That is, the inter-field interpolation pixel is parallelly moved by one half length of a motion vector. The comparison-judgment unit 22 shown in FIG. 7 compares an MV/2 equivalent to a movement amount in the duration of one clock time with a shift amount between the actual field signal Fld(t) at the clock time t and interpolated field signal Fld(t) in the line direction.

Figure 9:
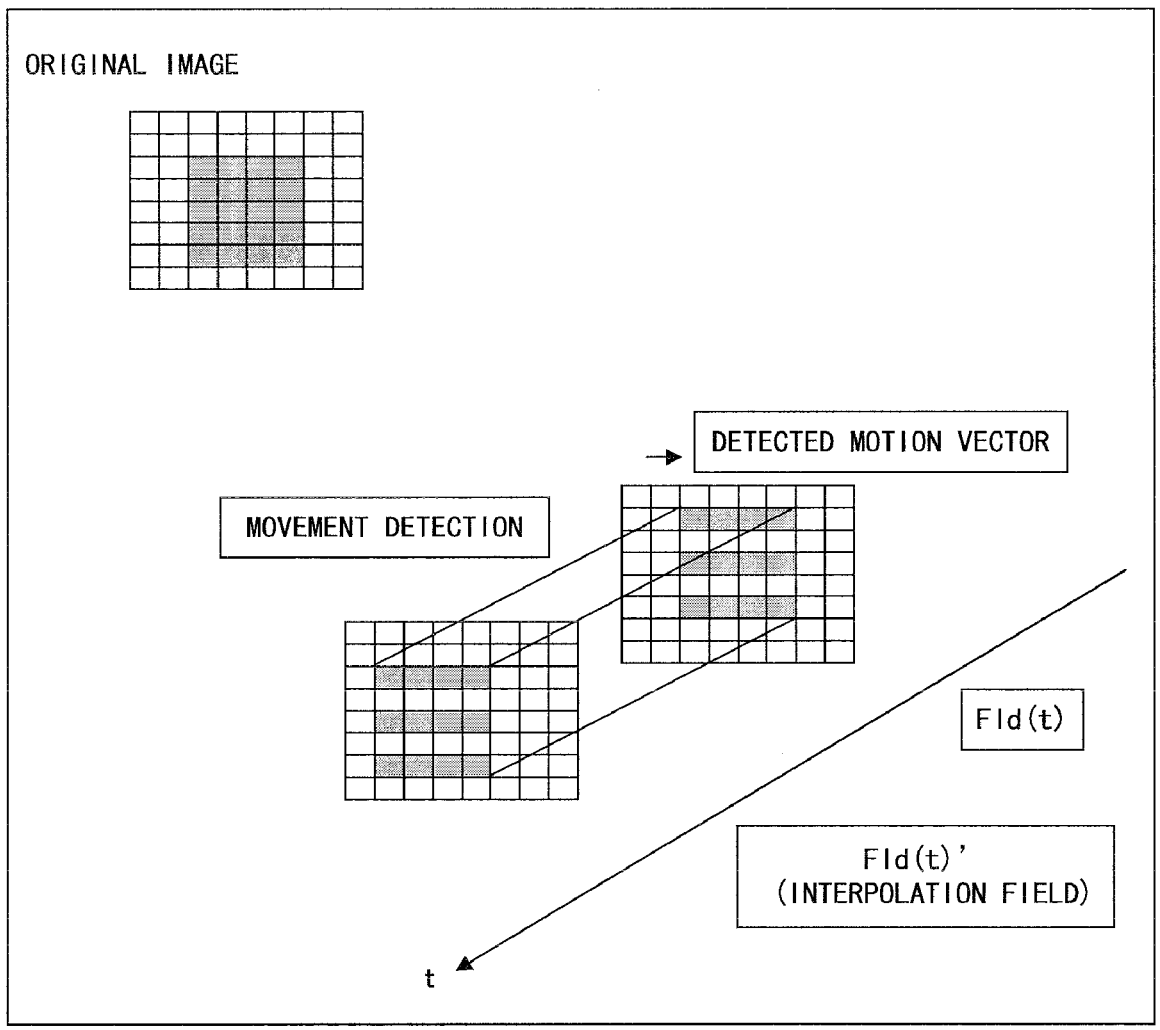
FIG. 9 is a diagram for describing an operation of an erroneous-interpolation detection unit.

FIG. 9 is a diagram for describing an operation of the erroneous-interpolation detection unit 14. As already described, the interpolation pixel Fld(t)' which is inter-field-interpolated corresponding to the clock time t is obtained by moving a field signal of different parity at one clock time prior by one half length of a motion vector MV. Note that the following description assumes only a horizontal movement for simplicity of description.

When the motion vector search unit 21 recognizes the fact that there is a shift between the field signal Fld(t) of the current field and its interpolation field signal Fld(t)' in the horizontal direction, the comparison-judgment unit 22 compares the shift of the interpolation field signal Fld(t)' with a vector MV/2 of the half length of the motion vector.

As described above, a video image constituted by frames such as an animation is transmitted in the sequence of 2:2 or 2:3 as a result of a telecine conversion. This makes a certain frame being transmitted by a division of the top field and bottom field. If there is a movement between the frame and the next, a motion vector MV is detected, whereas, if an inter-field interpolation is carried out based on the motion vector MV, a shift occurs between the actual field signal and interpolation field signal in the direction of vector because there is no actual movement between the top field and bottom field.

Based on this, if the length and direction of the shift between the field signal Fld(t) and interpolation field signal Fld(t)' are the same as those of the MV/2 that is one half of the motion vector, the comparison-judgment unit 22 judges that the video signal is a telecine video image.

FIGS. 10A and 10B are diagrams for describing an operation of the scan conversion apparatus 1 according to the present embodiment. FIG. 10A shows a signal at each stage when transmitting a video image; and FIG. 10B shows a signal at each stage when transmitting a progressive image. In the left to right direction of the drawing, signals are shown in the sequence of receiving at the individual transmit timing (e.g., 1/60 second), while in the top to bottom direction a video signal, the sequence of a video image signal transmitted at a certain timing being given to the respective units of the scan conversion apparatus 1 is shown. Here, the description exemplifies a case of an image of 4×6 pixels moving rightward by one pixel.

The first is a description on an operation of the scan conversion apparatus 1 when processing a video image. The top part of FIG. 10A shows a video image signal input to a video camera. The middle part of FIG. 10A shows a state of converting into an interlace signal for transmitting the video image signal shown in the top part, and the bottom part shows an interpolated video image signal. Since the image is moving by one pixel in the right direction every transmit timing, a motion vector MV is detected and a motion compensation IP conversion, that is, an inter-field interpolation is carried out. Pixels on the border line of the upper and lower images are not interpolated.

The next is a description on an operation of the scan conversion apparatus 1 when processing a progressive image. In FIG. 10B, the stage (1) is the original image, assuming it is transmitted at the rate of 30 frames per second (fps). The stage (2) is a video image signal subjected to a pull-down process. The example shown in FIG. 10B shows a 2:2 sequence in which each image is transmitted by being divided into the top and bottom fields. The stage (3) shows a signal which has been released from a pull-down at the sequence detection unit 16. If a sequence is detected by the sequence detection unit 16 as described above, a video image equivalent to the original image of the line (1) is obtained. If a sequence is not detected by the sequence detection unit 16, a normal motion compensation IP conversion is carried out.

The stage (4) shows a signal when an inter-field interpolation pixel is generated by the motion compensation IP conversion. Exemplifying an image of the clock time t=t3, if a motion vector is detected between the field signal at the clock time t=t3 and a field of the same parity, that is, the field signal at the clock time t=t1, then a MV=(2, 0). Because of this, an inter-field interpolation is carried out by assuming that the field signal at the clock time t3 is moved to the right by one pixel relative to the field of the clock time t=t2 (=t3−1) However, the signal at the clock time t2 is a signal obtained by a 2:2 pull-down and therefore the actual image is positioned toward left by two pixels as compared to the field signal at the clock time t3. Because of this, performing a motion compensation IP conversion on a telecine video image makes a comb-like disturbance of image in the horizontal direction visibly apparent. The scan conversion apparatus 1 according to the present embodiment is configured to detect the comb-like image disturbance (which is simply noted as "comb" hereinafter) at the erroneous-interpolation detection unit 14 and correct an image disturbance due to an IP conversion once again.

The stage (5) shows a signal modified for an erroneously interpolated pixel. If a comb is detected at the erroneous-interpolation detection unit 14, the scan conversion apparatus 1 judges that a use of an inter-field interpolation pixel brings about a visible disturbance (i.e., a horizontal jaggedness (i.e., an artifact) according to the example shown in FIG. 10B) of the video image, carries out a later described blend process and outputs a video image signal by using an appropriate interpolation pixel.

The stage (6) shows an interpolated frame. If the fact of an erroneous interpolation being generated by a motion compensation IP conversion is detected, an appropriate frame without a visible jaggedness related to the moving direction of the image is created by using a signal of each field. The detail of the method for creating a frame of the (6) is described later.

As described above, performing an inter-field interpolation process on a video image signal including a telecine video image due to a failure of detecting a sequence generates an erroneous interpolation. When such an erroneous interpolation is detected, the signal blending output unit 15 adds weighting for the signal output from each interpolation unit and synthesizes a video image signal so as to output an appropriately IP-converted video image signal.

Figure 11:
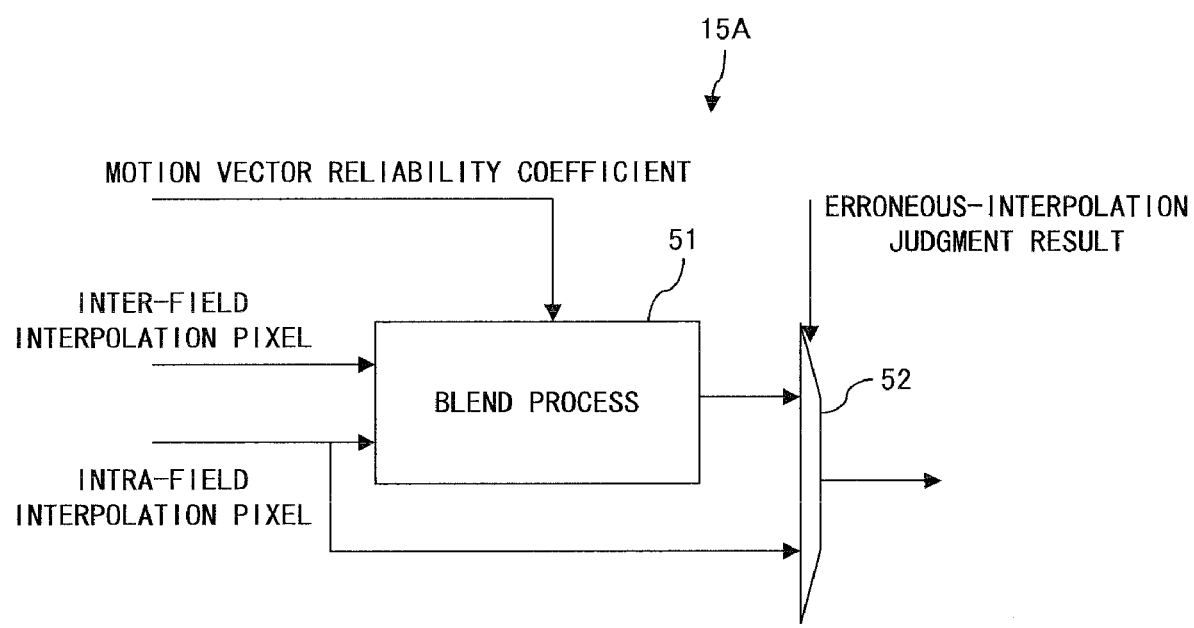
FIG. 11 exemplifies a configuration of a signal blending output unit.

FIG. 11 exemplifies a configuration of the signal blending output unit. The signal blending output unit 15A shown in FIG. 11 comprises a blend process unit 51 and a selector unit 52.

The blend process unit 51 outputs an interpolation pixel in accordance with a motion of the video image based on information input from the motion vector detection unit 11. As an example, it recognizes a zone having a movement within a video image and determines a ratio of an inter-field interpolation pixel to an intra-field interpolation pixel. In the present embodiment, the process for determining a ratio of an inter-field interpolation pixel to an intra-field interpolation pixel and synthesizing an output signal is expressed by a blend process.

The selector unit 52 of the signal blending output unit 15A judges whether a motion compensation IP conversion is carried out appropriately, that is, whether or not an inter-field interpolation pixel is appropriately generated, on the basis of information input from the erroneous-interpolation detection unit 14. Then, the selector unit 52 outputs a synthesized signal output from the blend process unit 51 if an erroneous interpolation is not detected, while outputs an intra-field interpolation pixel if an erroneous interpolation is detected.

The signal blending output unit 15A configured as shown in FIG. 11 outputs an intra-field interpolation pixel if an erroneous interpolation occurs to a video image signal including a telecine video image. Therefore, it is capable of preventing a visible appearance of an artifact due to an erroneous interpolation even if an IP conversion is performed on a video image signal including a telecine in which a sequence has not been detected.

FIG. 12 exemplifies another configuration of a signal blending output unit. The signal blending output unit 15B shown in FIG. 12 comprises a blend process unit 51, a selector unit 53 and field memory 54. The operation of the blend process unit 51 is similar to that of the blend process unit 51 comprised by the signal blending output unit 15A shown in FIG. 11 and therefore the description is omitted here.

The field memory 54 is used for recording a video image signal in the unit of field, thus recording an actual pixel signal and an interpolation pixel signal between fields. The selector unit 53, having recognized the fact of an erroneous interpolation being generated due to an IP conversion based on information input from the erroneous-interpolation detection unit 14, creates an output signal by using a signal stored in the field memory 54. As an example, it combines an interpolation pixel signal (which is interpolated for the top field) corresponding to the video image signal received at the clock time t2 with an interpolation pixel signal (which is interpolated for the bottom field) corresponding to the video image signal received at one field later (i.e., at the clock time t3), and combines the video image signal (i.e., the top field) received at the clock time t3 with the video image signal (i.e., the bottom field) received at the clock time t4 as shown in the stage (6) of FIG. 10B. This makes it possible to obtain a video image signal having no artifact. The generation of an output signal by using a video image signal stored in the field memory 54 is expressed as a "combination of fields".

FIGS. 13A and 13B are diagrams for describing a control of a combination of fields. FIG. 13A shows a method for expressing the top field and bottom field constituting one frame. The top part of FIG. 13B shows an actual field signal, and the middle part shows, in addition to the actual field signal, the interpolation pixels between fields generated by a motion compensation IP conversion. In the signal de-interlaced by performing a motion compensation IP conversion, a temporal shift occurs between the actual field signal and the one obtained by the interpolation. The temporal shift is the same as the one described by referring to the stage (4) of FIG. 10B.

The control of a combination of fields is configured to output the field interpolation data by delaying it by one field by using the field memory 54 as shown in the bottom part of FIG. 13B. This configuration makes it possible to carry out a motion compensation by effectively utilizing interpolation data between the fields, instead of discarding the data, even if an erroneous interpolation is detected at the erroneous-interpolation detection unit 14.

Furthermore, the motion vector detection unit 11 can be configured as described in the following so as to be capable of selecting an appropriate motion vector in higher accuracy.

FIG. 14 shows an improved method for obtaining a motion vector detected at the motion vector detection unit 11. The motion vector detection unit 11 comprises an edge detection unit 61, a first vector detection unit 62, an interpolation image generation unit 63 and a second vector detection unit 64.

The first vector detection unit 62 compares two field images of the same parity to detect a motion vector MV of the video image. The operation of the first vector detection unit 62 is the same as one described by referring to FIG. 8A. The edge detection unit 61 detects an edge of an image from two field images of the same parity.

The interpolation image generation unit 63 performs an interpolation process for a field image of parity which is different from the parity used for obtaining a motion vector at the first vector detection unit 62. That is, it obtains an interpolation pixel for the same line as one used for obtaining a motion vector MV. Note that the method for generating an interpolation image at the interpolation image generation unit 63 employs the above described intra-field interpolation method.

Incidentally, the generation method of an interpolation image is appropriately controlled by a presence of an edge within a field image of different parity. The nearest neighbor method is used as one example of the most optimum method.

Here, the edge detection unit 61 detects an edge by using a method of using a known edge detection operator such as Sobel and Laplacian, or a method of examining a degree of matching of vector candidates at the first vector detection unit 62. That is, the method for examining a degree of matching monitors the maximum and minimum degrees of matching when searching a candidate in the vector search. Then, it can judge that there is a steeper edge proportionately with the magnitude of dynamic range between the minimum value (i.e., the most optimal vector) and maximum value of the degree of matching and with closeness of coordinates which constitute a candidate of vector.

The detection of an edge may be carried out in the same direction as a motion vector MV, based on the motion vector MV obtained by the first vector detection unit 62. Alternatively, it may be detected in the horizontal direction of an image, that is, in the line direction. When the interpolation image generation unit 63 generates an interpolation image, a matching process for detecting a motion vector can be carried out in higher accuracy also for a zone with higher spatial frequency by referring to the information related to an edge of the image.

The second vector detection unit 64 examines, by using the interpolation image generated at the interpolation image generation unit 63, whether or not the motion vector detected by the first vector detection unit 62 is appropriately selected.

The motion vector detection unit 11 shown in FIG. 14 refers to a field image of different parity in order to obtain a motion vector in higher accuracy, and the motion vector is obtained between fields of the same parity at the first vector detection unit 62 in the same way as shown in FIG. 8A. That is, the interpolation image generation unit 63 generates a field image of the same parity by means of an interpolation process from a field image of different parity. Then, the second vector detection unit 64 refers to the image generated at the interpolation image generation unit 63 and validates the motion vector MV obtained at the first vector detection unit 62. If an improper candidate is selected, it carries out processes of re-selecting another one or selecting/leaving one from some candidates.

The next is a description on an operation of the motion vector detection unit shown in FIG. 14.

FIGS. 15A and 15B are diagrams describing an operation of the motion vector detection unit 11 shown in FIG. 14. Let it be considered a case of a transmitted image being a video image. As shown in the upper part of FIG. 15A, a rectangular image of a 4×6 size moves to the right by one pixel for each field. Interlace signals of the top and bottom fields are alternately input to the scan conversion apparatus 1 as shown in the lower part of FIG. 15A, vis-à-vis the video image shown in the upper part of FIG. 15A.

The first vector detection unit 62 of FIG. 14 obtains a motion vector MV from the image shown in the lower part of FIG. 15A. FIG. 15B is a diagram describing an operation of the process for validating the motion vector MV obtained for the image shown in the lower part of FIG. 15A.

A motion vector MV related to a field at a clock time t=n is obtained by comparing with the image at the clock time t=n−2 that is a field image of the same parity, likewise the method for obtaining the above described motion vector. The validation is carried out for a fact that a vector MV/2 of a half length of the obtained motion vector MV is on the interpolation pixel of the image at the clock time t=n−1 between the two images used for obtaining the motion vector.

According to the example shown in FIG. 15B, the judgment is whether the three vectors of the respective one half lengths of the three vectors obtained from the field images at the clock times t=n and t=n−2 are on the interpolation images of the fields at the respective clock times t=n−1.

Of the three vectors of one half lengths of the three motion vectors obtained at the first vector detection unit 62, the tips of the vectors corresponding to the middle part and lower part of the image at the clock time t=n−2 and clock time t=n are on the interpolation image at the clock time t=n−1. In this case, the second vector detection unit 64 judges that an interpolation pixel exists at the tip of a vector as a result of carrying out a matching between the vector and interpolation pixel, and the first vector detection unit 62 judges that these motion vector has a high degree of reliability and that an appropriate vector is selected.

Meanwhile, as for a vector corresponding to the line of the upper part of the images at the clock times t=n−2 and t=n, an interpolation image corresponding to the clock time t=n−1 does not exist. In this case, the second vector detection unit 64 judges that the motion vector has a low degree of reliability and that an appropriate motion vector is not selected. A motion vector which is judged by the second vector detection unit 64 as not appropriately selected is subjected to a process such as re-selecting a motion vector.

FIGS. 16A and 16B are diagrams describing a process for comparing a vector MV/2 of half length of a motion vector MV with an interpolation image.

FIG. 16A shows a motion vector MV obtained between field images of the same parity by the first vector detection unit 62; and FIG. 16B shows the processes of obtaining a vector MV/2 of one half length of the obtained motion vector MV and comparing the vector MV/2 with an interpolation image, obtained from an image which parity is different from that of the field image used for obtaining the motion vector.

In FIG. 16A, the solid line and dotted line respectively show fields of mutually different parities, that is, the top and bottom fields. Here, a motion vector MV is obtained for the field image expressed by the solid line.

In FIG. 16B, the solid line shows an interpolation pixel of the field at the clock time t=n−1, that is, a pixel of the same line as the field at the clock time t=n−2 (and t=n). It is judged whether or not the tip of the vector MV/2 of the half length, obtained against the motion vector MV shown in FIG. 16A, is on the interpolation pixel in the field at the clock time t=n−1. If the tip of the vector MV/2 is on the interpolation pixel for the image of the clock time t=n−1, then the obtained vector MV is judged to be appropriate.

Figure 17:
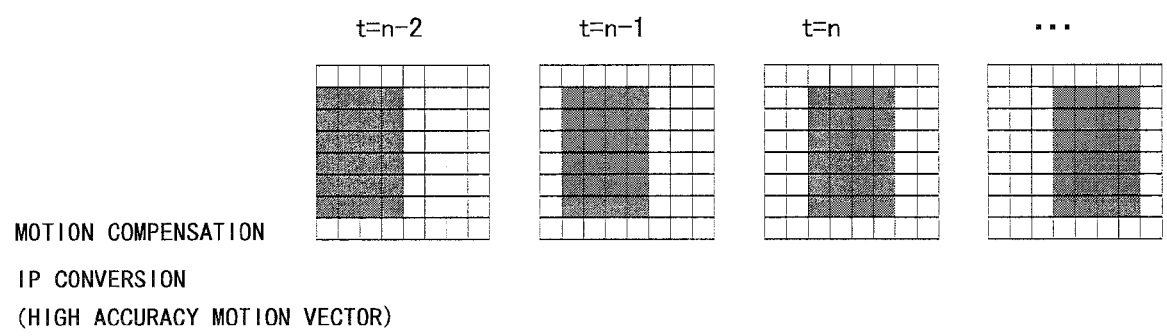
FIG. 17 is a diagram showing an obtained image when performing a motion compensation IP conversion by using a motion vector obtained by the motion vector detection unit shown in FIG. 14.

FIG. 17 is a diagram showing an obtained image when performing a motion compensation IP conversion by using a motion vector obtained by the motion vector detection unit 11 shown in FIG. 14.

As for the images of the clock times t=n−2 and t=n of FIGS. 16A and 16B, a validation at the second vector detection unit 64 for the line in the upper part makes it apparent that an interpolation pixel does not exist at the tip of the vector. Based on the fact that an interpolation pixel corresponding to a motion vector (i.e., a vector of half length thereof) does not exist for the uppermost line, an interpolation of a pixel can be carried out for the uppermost line at the clock time t=n−1 as shown in FIG. 17 according to an intra-field interpolation.

Likewise for other fields, it is enabled to carry out an appropriate interpolation based on the validation result of the second vector detection unit 64.

As described above, the motion vector detection unit 11 shown in FIG. 14 is configured to validate the obtained motion vector MV at the second vector detection unit 64, judge whether or not an interpolation image if different parity exists at the tip of the vector MV/2, and re-select an appropriate motion vector if an interpolation image does not exists. This configuration makes it possible to obtain a motion vector in higher accuracy.

Meanwhile, as for a zone of a high spatial frequency, that is, a zone of a dense image, an erroneous detection of a motion vector tends to occur. An erroneous detection of a motion vector causes the problems such as a degradation of image when carrying out an inter-field interpolation pixel generation process by using the motion vector and a decrease in accuracy of an erroneous-interpolation detection when carrying out an erroneous-interpolation detection process. The above described motion vector validation process, however, improves the accuracy of a motion vector MV/2 which is input to the first interpolation pixel generation unit 12 shown in FIG. 6 and the judgment unit 22 of the erroneous-interpolation detection unit 14 shown in FIG. 7, thereby contributing to a prevention of the occurrence of these problems.

What is claimed is:

1. A scan conversion apparatus for converting an interlace video signal into a progressive image signal, comprising:
   a first interpolation pixel generation unit for generating an interpolation pixel of a nonexistent line for one of images of two fields of same parity based on a motion vector detected between images of the two fields;
   a second interpolation pixel generation unit for generating an interpolation pixel of a nonexistent line by using a pixel within a field for an image of the field for which an interpolation pixel is generated by the first interpolation pixel generation unit among the images in the two fields;
   an erroneous-interpolation detection unit for detecting an erroneous interpolation among interpolation pixels generated by the first interpolation pixel generation unit based on a comparison with a pixel existing in the upper and lower lines;
   an output unit for outputting a video image signal by using an interpolation pixel generated by the first and second interpolation pixel generation units based on the detection result of the erroneous-interpolation detection unit.

2. The scan conversion apparatus according to claim 1, further comprising
   a sequence detection unit for detecting an event of a telecine-converted interlace video signal being input, and
   a pull-down release unit for converting an interlace video signal into a progressive image signal if the interlace video image signal which is telecine-converted is detected by the sequence detection unit, wherein
   the output unit outputs a video image signal by using interpolation pixels generated by said first and second interpolation pixel generation units if a progressive image conversion process has not been carried out by the pull-down release unit.

3. The scan conversion apparatus according to claim 1, wherein
   the erroneous-interpolation detection unit comprises
   a shift detection unit for detecting a shift in the direction of line, occurring between a line determined to be a subject of interpolation performed by the first interpolation pixel generation unit and a line located either above or below the aforementioned line by one line, and
   a comparison-judgment unit for judging whether or not an erroneous interpolation based on a comparison between a shift and the motion vector related to the direction of line if the shift is detected by the shift detection unit.

4. The scan conversion apparatus according to claim 3, wherein
   the comparison-judgment unit judges that the interpolation performed by the first interpolation pixel generation unit is an erroneous interpolation if the shift is equal to a half of the motion vector in the direction of line.

5. The scan conversion apparatus according to claim 4, wherein
   the output unit outputs a video signal by using the interpolation pixel generated by the second interpolation pixel generation unit if the comparison-judgment unit judges to be an erroneous interpolation.

6. The scan conversion apparatus according to claim 4, further comprising
   a recording unit for recording a pixel signal of an input field and a pixel signal of the field generated by the first interpolation pixel generation unit, wherein
   the output unit combines a pixel signal of the previous field recorded in the recording unit with the pixel signal of the field judged to be an erroneous interpolation and outputs the combined pixel signal if the comparison-judgment unit judges to be an erroneous interpolation.

7. The scan conversion apparatus according to claim 1, further comprising
   a motion vector detection unit for detecting the motion vector, wherein
   the motion vector detection unit comprises
   a first motion vector detection unit for obtaining a motion vector from a pair of field images of same parity,
   a field image generation unit for generating a field image of the same parity from a field image of different parity, and
   a second motion vector detection unit for validating the motion vector obtained by the first vector detection unit based on the generated image and an edge detected from the pair of field images of the same parity, wherein
   the erroneous-interpolation detection unit detects an erroneous interpolation by using a motion vector validated by the second motion vector detection unit.

8. The scan conversion apparatus according to claim 7, detecting the edge in a same direction as the motion vector obtained by the first motion vector detection unit in the detection of the edge.

9. The scan conversion apparatus according to claim 8, detecting the edge in a direction of line in the detection of the edge.

10. A scan conversion method for converting an interlace video signal into a progressive image signal, comprising the processes of:
    generating an inter-field interpolation pixels for one of images of two fields of same parity based on a motion vector detected between the images of the two fields;
    generating an intra-field interpolation pixel for the image of the field for which the interpolation pixel between the fields has been generated among the images of the two fields;

detecting an erroneous interpolation related to the image of the field for which the inter-field interpolation pixel has been generated, on the basis of a comparison with a field image between the images of the two fields; and outputting a video image signal by using the inter-field interpolation pixel and the intra-field interpolation pixel based on a result of the detection of the erroneous interpolation.

11. An erroneous-interpolation detection method for detecting an erroneous interpolation occurring when converting an interlace video image signal into a progressive image signal, comprising the processes of:

generating an inter-field interpolation pixel for one of images of two fields of same parity based on a motion vector detected between the images of the two fields;

generating an intra-field interpolation pixel for the image of the field for which the interpolation pixel between the fields has been generated among the images of the two fields;

detecting an erroneous interpolation related to the image of the field for which the inter-field interpolation pixel has been generated, on the basis of a comparison with a field image between the images of the two fields; and outputting a video image signal by using the inter-field interpolation pixel and the intra-field interpolation pixel based on a result of the detection of the erroneous interpolation.

* * * * *